US012432120B2

(12) United States Patent
Gao et al.

(10) Patent No.: US 12,432,120 B2
(45) Date of Patent: Sep. 30, 2025

(54) COMMUNICATION NETWORKING METHOD AND SYSTEM APPLICABLE TO WIDE-AREA DECENTRALIZED CHARGING PILES

(71) Applicant: NANJING UNIVERSITY OF POSTS AND TELECOMMUNICATIONS, Nanjing (CN)

(72) Inventors: Hui Gao, Nanjing (CN); Yongbo Sui, Nanjing (CN); Guoping Jiang, Nanjing (CN); Liangliang Chen, Nanjing (CN); Jian Liu, Nanjing (CN)

(73) Assignee: NANJING UNIVERSITY OF POSTS AND TELECOMMUNICATIONS, Nanjing (CN)

( * ) Notice: Subject to any disclaimer, the term of this patent is extended or adjusted under 35 U.S.C. 154(b) by 0 days.

(21) Appl. No.: 18/870,470

(22) PCT Filed: Mar. 25, 2024

(86) PCT No.: PCT/CN2024/083487
§ 371 (c)(1),
(2) Date: Nov. 29, 2024

(87) PCT Pub. No.: WO2025/156392
PCT Pub. Date: Jul. 31, 2025

(65) Prior Publication Data
US 2025/0260625 A1    Aug. 14, 2025

(30) Foreign Application Priority Data

Jan. 24, 2024   (CN) ......................... 202410098813.2

(51) Int. Cl.
*H04L 41/14* (2022.01)
*H04L 41/16* (2022.01)

(52) U.S. Cl.
CPC ............ *H04L 41/145* (2013.01); *H04L 41/16* (2013.01)

(58) Field of Classification Search
None
See application file for complete search history.

(56) References Cited

U.S. PATENT DOCUMENTS

2020/0412635 A1   12/2020  Jha et al.
2022/0116280 A1*   4/2022  Zhang ................. H04L 43/0888
(Continued)

FOREIGN PATENT DOCUMENTS

CN   104301864 A   1/2015
CN   106507373 A   3/2017
(Continued)

OTHER PUBLICATIONS

Zhang Jianwei, et al., Adaptive Communication Networking of Charging Pile Based on Channel Prediction Technology, Guangdong Electric Power, 2023, pp. 1-8, vol. 36 No. 12.

*Primary Examiner* — Fadi Haj Said
(74) *Attorney, Agent, or Firm* — Bayramoglu Law Offices LLC (57) ABSTRACT

A communication networking method applicable to wide-area decentralized charging piles includes: initializing the total number of wide-area decentralized charging piles and coordinate parameters thereof; initializing related parameters of a hybrid learning network, and predicting and judging optimal networking nodes of the charging piles by using the hybrid learning network; and performing connection according to the optimal networking nodes, so as to form a communication network of the wide-area decentralized charging piles. With regard to the communication networking applicable to the wide-area decentralized charging piles, the communication networking method evaluates a channel environment between the wide-area decentralized (Continued)

charging piles, and screens out optimal master nodes according to the quality of a communication environment between the charging piles, so as to form a communication networking scheme of the wide-area decentralized charging piles. In this way, when the distances between the charging piles are relatively large, the communication reliability can be guaranteed.

6 Claims, 4 Drawing Sheets

(56) References Cited

U.S. PATENT DOCUMENTS

| | | | | |
|---|---|---|---|---|
| 2022/0121884 A1* | 4/2022 | Zadeh | ................... | G06N 3/006 |
| 2023/0137791 A1* | 5/2023 | Yararbas | ............ | G01C 21/3617 |
| | | | | 701/123 |
| 2024/0048619 A1* | 2/2024 | Bandeira | ............... | H04L 67/125 |

FOREIGN PATENT DOCUMENTS

| | | | |
|---|---|---|---|
| CN | 114143248 | A | 3/2022 |
| CN | 117615397 | * | 2/2024 |
| CN | 117615397 | A | 2/2024 |

\* cited by examiner

COMMUNICATION NETWORKING METHOD AND SYSTEM APPLICABLE TO WIDE-AREA DECENTRALIZED CHARGING PILES

CROSS REFERENCE TO THE RELATED APPLICATIONS

This application is the national phase entry of International Application No. PCT/CN2024/083487, filed on Mar. 25, 2024, which is based upon and claims priority to Chinese Patent Application No. 202410098813.2, filed on Jan. 24, 2024, the entire contents of which are incorporated herein by reference.

TECHNICAL FIELD

The present invention relates to the field of new energy vehicles, and particularly relates to a communication networking method and system applicable to wide-area decentralized charging piles.

BACKGROUND

The continuous increase in the number of electric vehicles poses challenges to the construction of basic charging facilities of new energy vehicles. How to implement communication networking of the electric vehicles is one of basic problems in the construction of the basic charging facilities of the new energy vehicles. At present, there are studies in which a charging control instruction is executed by a target charging pile, the communication between the charging pile and a control platform is achieved just by placing a gateway in a location with a local area network, or networking is performed on remaining auxiliary nodes other than a master node and an auxiliary node in a cluster system channel by using wireless communication, so as to complete networking and to perform maintenance; and when the charging piles of the electric vehicles are densely distributed, the above manner is relatively effective.

However, when the distances between the charging piles are relatively large and when the charging piles are distributed in a wide-area decentralization manner, the current technical means cannot solve the communication networking problem of the charging piles. Therefore, in order to solve the above problem, it is of great significance to provide a communication networking method applicable to wide-area decentralized charging piles.

SUMMARY

In view of the above existing problems, the present invention is proposed.

Therefore, the present invention provides a communication networking method and system applicable to wide-area decentralized charging piles, so as to solve the problem that when the distances between the charging piles are relatively large and when the charging piles are distributed in a wide-area decentralization manner, communication networking cannot be performed on the existing charging piles accurately and efficiently.

To solve the above technical problems, the present invention provides the following technical solutions:

The first aspect, the invention provides a communication networking method applicable to wide-area decentralized charging piles, comprising:

initializing the total number of wide-area decentralized charging piles and coordinate parameters thereof;

initializing related parameters of a hybrid learning network, and predicting and judging optimal networking nodes of the charging piles by using the hybrid learning network; and performing connection according to the optimal networking nodes, so as to form a communication network of the wide-area decentralized charging piles.

As a preferred solution for the communication networking method applicable to wide-area decentralized charging piles, initializing the total number of the wide-area decentralized charging piles and the coordinate parameters thereof comprises:

expressing the coordinates of the wide-area decentralized charging piles as: $(x_i, y_i)$, $i=1, 2, 3, \ldots, N$, wherein N is the total number of the wide-area decentralized charging piles.

As a preferred solution for the communication networking method applicable to wide-area decentralized charging piles, initializing the related parameters of the hybrid learning network, and predicting and judging the optimal networking nodes of the charging piles by using the hybrid learning network, comprises:

defining a first master node $(x_1, y_1)$ as a first optimal master node $(x_{1,op}, y_{1,op})$, that is, $x_1=x_{1,op}$, $y_1=y_{1,op}$;

performing first judgement, wherein the first judgement comprises:

judging the distances $r_{i1}$ between other charging piles and the first optimal master node, which distance is expressed as: $r_{i1}=\sqrt{(x_i-x_{1,op})^2+(y_i-y_{1,op})^2}$ wherein, $i=2, 3, \ldots, N$;

sorting the distances of N−1 charging piles from small to large, and intercepting n charging piles with the minimum distance to establish a second optimal master node judgment data set $\Phi$, wherein the data set $\Phi$ is serial numbers of the n charging piles with the minimum distance to the first optimal master node;

predicting channel state information of the first optimal master node and the n charging piles in the data set $\Phi$ by using the hybrid learning network, so as to acquire prediction errors $e_j$, $j=1, 2, 3, \ldots, n$;

sorting the prediction errors, defining the charging pile with the minimum error as a second optimal master node, defining other charging piles in the data set $\Phi$ as secondary nodes;

removing a corresponding charging pile label in $\Phi$ from a total data set $\Phi_{total}$ of charging pile labels to obtain a deleted total data set $\Phi_{total}'$ of charging pile labels;

performing second judgement, wherein the second judgement comprises:

judging the distance $r_{i2}$ between the total data set $\Phi_{total}'$ of charging pile labels and the second optimal master node $(x_{2,op}, y_{2,op})$, which distance is expressed as:

$$r_{i2}=\sqrt{(x_i-x_{2,op})^2+(y_i-y_{2,op})^2}$$

wherein, $i=1, 2, 3, \ldots, N_{\Phi_{total}'}$, $N_{\Phi_{total}'}$ is the size of the total data set $\Phi_{total}'$ of charging pile labels;

sorting the distances of $N_{\Phi_{total}'}$ charging piles, and intercepting n charging piles with the minimum distance to update the master node judgment data set $\Phi$;

predicting channel state information of the second master node and the n charging piles in the data set $\Phi$ by using the hybrid learning network, so as to acquire prediction errors $e_j$, $j=1, 2, 3, \ldots, n$;

sorting the prediction errors, defining the charging pile with the minimum error as a third optimal master node, defining other charging piles in the data set Φ as secondary nodes; removing a corresponding charging pile label in Φ from the total data set $\Phi_{total}'$ of charging pile labels to update the deleted total data set $\Phi_{total}'$ of charging pile labels;

judging whether $\Phi_{total}'$ is an empty set; if not, circulating the second judgement; and sequentially outputting the serial numbers of the optimal master nodes.

As a preferred solution for the communication networking method applicable to wide-area decentralized charging piles, predicting the channel state information of the second optimal master node and the n charging piles in the data set Φ by using the hybrid learning network, so as to acquire the prediction errors $e_j$, j=1, 2, 3, . . . , n comprises:

estimating frequency-domain channel state information $H_j \in \mathbb{R}^{K \times N_s}$ of the optimal node and a j-th charging pile by using a channel, wherein K and $N_s$ are respectively the total number of sub-carriers and the sampling number of pilot sub-carriers;

acquiring a delay power spectrum $h_j \in \mathbb{R}^{K \times N_s}$ of the optimal node and the jth charging pile by means of inverse decentralized Fourier transform;

establishing a hybrid learning network prediction model for an lth multi-path $h_j^l$ of the delay power spectrum, and performing prediction to obtain a predicted value $\hat{h}_j^l$, l=1, 2, 3, . . . , $L_T$ of the l-th multi-path, wherein $L_T$ is the total number of transmission multi-paths between the optimal node and the j-th charging pile and performing Fourier transform on the predicted $\hat{h}_j^l$ to obtain predicted frequency-domain channel state information $\hat{H}_j$, using the predicted frequency-domain channel state information to jointly calculate a root mean square error $e_j$ with theoretical frequency-domain channel state information $\tilde{H}_j$, wherein the root mean square error is expressed as:

$$e_j = \sum_{l=1}^{L_T} \left( \hat{h}_j^l - h_j^l \right)^2.$$

As a preferred solution for the communication networking method applicable to wide-area decentralized charging piles, establishing the hybrid learning network prediction model for the lth multi-path $h_j^l$ of the delay power spectrum comprises:

initializing the number P of neurons of a first feature layer and the number Q of neurons of a second feature layer of the hybrid learning network, and then an output matrix G of the first feature layer may be expressed as:

$$G = \tanh(XW_{in})$$

wherein, tanh is a hyperbolic tangent function, and X is input data with respect to the lth multi-path $h_j^l$ of the delay power spectrum in a training stage and is expressed as:

$$X = \begin{bmatrix} h_j^l(1) & h_j^l(2) & \ldots & h_j^l(S) \\ h_j^l(S+1) & h_j^l(S+2) & \ldots & h_j^l(2S) \\ \vdots & \vdots & \ddots & \vdots \\ h_j^l(N_T - S + 1) & \ldots & & h_j^l(N_T) \end{bmatrix}$$

where $N_T$ is the number of data for training the lth multi-path J of the delay power spectrum in the training stage, and $N_s > N_T$, $W_{in}$ is a connection weight between an input layer and the first feature layer, and $W_{in}$ is randomly generated between 0 and 1;

calculating an output matrix U of the second feature layer:

$$U = \tanh(GW)$$

wherein, W is a connection weight between the first feature layer and the second feature layer, and W is randomly generated between 0 and 1;

estimating a weight matrix $W_{out}$ of an output layer by a loss function J, which is expressed as:

$$J = \min \left( \|Y - [X; G; U]W_{out}\|_2^2 + \lambda \sum_{i=1}^{N_T + P + Q} W_{out}^2 + \sum_{i=1}^{N_T + P + Q} (\vartheta_i W_{out})^{0.25} \right)$$

wherein, Y is a target matrix corresponding to an input matrix X of the lth multi-path $h_j^l$ of the delay power spectrum in the training stage, [X;G;U] represents a row connection matrix with respect to X, G and U, $\|*\|_2$ represents a $l_2$ norm, λ is a punishment coefficient of the $l_2$ norm, and $\vartheta_i$ is an i-t random coefficient between 0 and 1;

solving the loss function J by using an adaptive particle sphere algorithm, so as to obtain an estimated output weight matrix $\hat{W}_{out}$; and obtaining the predicted value $\hat{h}_j^l$ of the lth multi-path of the delay power spectrum by using the trained hybrid learning network.

As a preferred solution for the communication networking method applicable to wide-area decentralized charging piles, solving the loss function J by using the adaptive particle sphere algorithm, so as to obtain the estimated output weight matrix $\tilde{W}_{out}$ comprises:

initializing the number $M_s$ of populations of particle spheres, wherein a space vector of each particle sphere is $\hat{W}_{out}^k$, k=1, 2, 3, . . . , $M_s$ and the maximum number of iterations is D;

defining an iteration number label d, and setting d=1;

performing substitution solution, which comprises: substituting the space vector $(\hat{W}_{out}^k)_d$ of a kth particle sphere in the current iteration process into the loss function J, and solving a fitness value $f_d^k$, k=1, 2, 3, . . . , $M_s$ of the kth particle sphere, so as to obtain an optimal particle sphere space vector $(\hat{W}_{out})_{d,opt}$ during the d-th iteration;

updating the space vector of the kth particle sphere, which is expressed as:

$$(\hat{W}_{out}^k)_{d+1} = (\hat{W}_{out}^k)_d + \beta((\hat{W}_{out}^g)_d - (1-\varphi)(\hat{W}_{out}^k)_d - \varphi (\hat{W}_{out}^k)_{d-1}) + \alpha(\text{Rand} - 0.5)$$

wherein, β, φ, α and Rand are all random coefficients between 0 and 1, $(\hat{W}_{out}^g)_d$ is the space vector of a gth particle sphere during the d-th iteration, g=1, 2, 3, . . . , $M_s$, g≠k.

judging whether d is equal to D; if not, d=d+1, returning to the substitution solution step; and outputting the optimal particle sphere space vector $(\hat{W}_{out})_{opt}$.

As a preferred solution for the communication networking method applicable to wide-area decentralized charging piles, obtaining the predicted value $\hat{h}_j^l$ of the lth multi-path of the delay power spectrum by using the trained hybrid learning network comprises:

in a prediction stage, calculating an output matrix $G_T$ of the first feature layer:

$$G_T = \tanh(X_T W_{in})$$

wherein, $X_T$ is input data with respect to the lth multi-path $h_j^l$ of the delay power spectrum in the prediction stage;
calculating an output matrix $U_T$ of the second feature layer:

$$U_T = \tanh(G_T W); \text{ and}$$

calculating an output matrix $\hat{Y}$ of the output layer:

$$\hat{Y} = [X_T; G_T; U_T](\hat{W}_{out})_{opt}$$

wherein, $\hat{Y} = \hat{h}_j^l$.

The second aspect, the invention provides a communication networking system applicable to wide-area decentralized charging piles, comprising:
   an initialization module, configured to initialize the total number of wide-area decentralized charging piles and coordinate parameters thereof;
   a judging module, configured to initialize related parameters of a hybrid learning network, and predict and judge optimal networking nodes of the charging piles by using the hybrid learning network; and
   a networking module, configured to perform connection according to the optimal networking nodes, so as to form a communication network of the wide-area decentralized charging piles.

The third aspect, the invention provides an electronic device, comprising:
   a memory and a processor, wherein
   the memory is configured to store a computer-executable instruction, the processor is configured to execute the computer-executable instruction, and the computer-executable instruction, when executed by the processor, implements the steps of the communication networking method applicable to wide-area decentralized charging piles.

The fourth aspect, the invention provides a computer-readable storage medium, storing a computer-executable instruction, wherein the computer-executable instruction, when executed by a processor, implements the steps of the communication networking method applicable to wide-area decentralized charging piles.

Compared with the prior art, the present invention has the following beneficial effects: with regard to the communication networking applicable to the wide-area decentralized charging piles, the present invention evaluates a channel environment between the wide-area decentralized charging piles, and screens out optimal master nodes according to the quality of a communication environment between the charging piles, so as to form a communication networking scheme of the wide-area decentralized charging piles. In this way, when the distances between the charging piles are relatively large and when the charging piles are distributed in the wide-area decentralization manner, the defect that the communication reliability cannot be guaranteed is compensated for, and a foundation is laid for comprehensively implementing the communication networking of electric vehicles subsequently.

BRIEF DESCRIPTION OF THE DRAWINGS

To illustrate technical solutions in the embodiments of the present invention more clearly, a brief introduction on the drawings which are needed in the description of the embodiments is given below. Apparently, the drawings in the description below are merely some of the embodiments of the present invention, and for those ordinary skilled in the art, other drawings may also be obtained according to these drawings without any creative effort.

DETAILED DESCRIPTION OF THE EMBODIMENTS

In order to make the above objectives, features and advantages of the present invention clearer and more comprehensible, specific embodiments of the present invention are described in detail below in combination with the drawings, and apparently, the embodiments described below are merely a part, but not all, of the embodiments of the present invention. All of other embodiments, obtained by those ordinary skilled in the art based on the embodiments in the present invention without any creative effort, shall all fall into the protection scope of the present invention.

Embodiment 1

Figure 1:
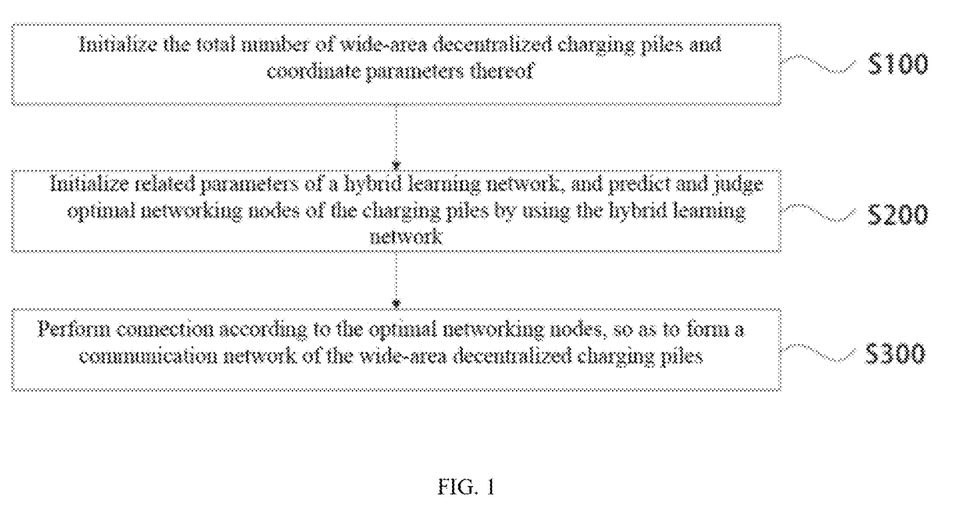
FIG. 1 is an overall schematic flowchart of a communication networking method applicable to wide-area decentralized charging piles in an embodiment of the present invention.
Figure 2:
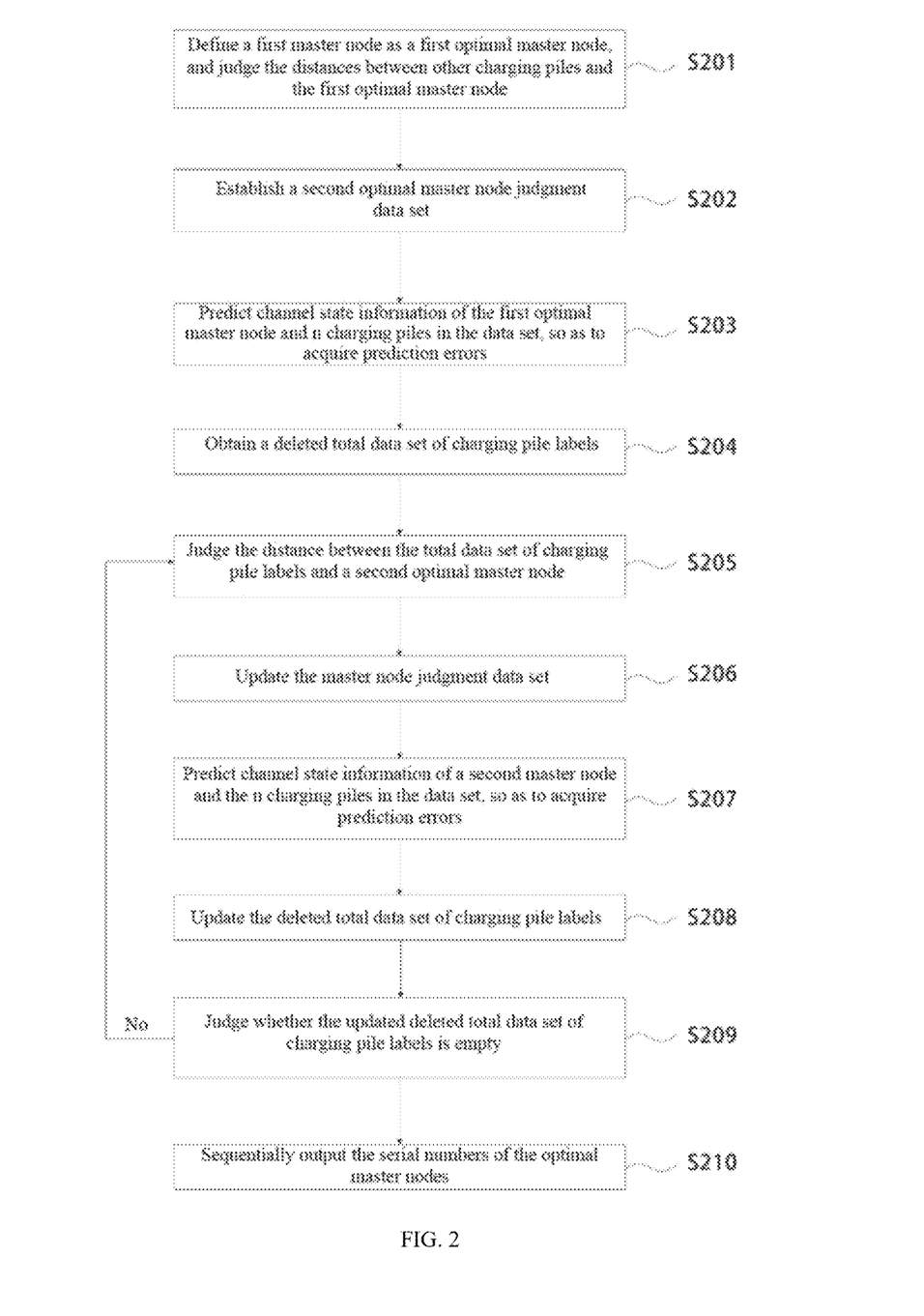
FIG. 2 is a schematic diagram of an output process of an optimal node in a communication networking method applicable to wide-area decentralized charging piles in an embodiment of the present invention.

Referring to FIGS. 1-4, an embodiment of the present invention provides a communication networking method applicable to wide-area decentralized charging piles, wherein the method includes, as shown in FIGS. 1-2:
   S100: initializing the total number of wide-area decentralized charging piles and coordinate parameters thereof;
   further, initializing the total number of the wide-area decentralized charging piles and the coordinate parameters thereof includes:
   expressing the coordinates of the wide-area decentralized charging piles as: $(x_i, y_i)$, $i=1, 2, 3, \ldots, N$ wherein N is the total number of the wide-area decentralized charging piles.
   S200: initializing related parameters of a hybrid learning network, and predicting and judging optimal networking nodes of the charging piles by using the hybrid learning network;
   further, initializing the related parameters of the hybrid learning network, and predicting and judging the optimal networking nodes of the charging piles by using the hybrid learning network, includes:
   S201: defining a first master node $(x_1, y_1)$ as a first optimal master node $(x_{1,op}, y_{1,op})$, that is, $X_1 = x_{1,op}$, $y_1 = y_{1,op}$;
   performing first judgement, wherein the first judgement includes:
   judging the distances $r_{i1}$ between other charging piles and the first optimal master node, which distance is expressed as: $r_{i1} = \sqrt{(x_i - x_{1,op})^2 + (y_i - y_{1,op})^2}$ wherein, i=2, 3, ..., N;

S202: sorting the distances of N−1 charging piles from small to large, and intercepting n charging piles with the minimum distance to establish a second optimal master node judgment data set Φ, wherein the data set Φ is serial numbers of the n charging piles with the minimum distance to the first optimal master node;

S203: predicting channel state information of the first optimal master node and the n charging piles in the data set Φ by using the hybrid learning network, so as to acquire prediction errors $e_i$, j=1, 2, 3, ..., n;

further, predicting the channel state information of the second optimal master node and the n charging piles in the data set Φ by using the hybrid learning network, so as to acquire the prediction errors $e_j$, j=1, 2, 3, ..., n includes:

S2031: estimating frequency-domain channel state information $H_j \in \mathbb{R}^{K \times N_s}$ of the optimal node and a jth charging pile by using a channel, wherein K and $N_s$ are respectively the total number of sub-carriers and the sampling number of pilot sub-carriers;

S2032: acquiring a delay power spectrum $h_j \in \mathbb{R}^{K \times N_s}$ of the optimal node and the jth charging pile by means of inverse decentralized Fourier transform;

S2033: establishing a hybrid learning network prediction model for an lth multi-path $h_j^l$ of the delay power spectrum, and performing prediction to obtain a predicted value $\hat{h}_j^l$, l=1, 2, 3, ..., $L_T$ of the lth multi-path, wherein $L_T$ is the total number of transmission multi-paths between the optimal node and the jth charging pile;

further, establishing the hybrid learning network prediction model for the l-th multi-path $h_j^l$ of the delay power spectrum includes:

initializing the number P of neurons of a first feature layer and the number Q of neurons of a second feature layer of the hybrid learning network, and then an output matrix G of the first feature layer may be expressed as:

$G = \tanh(XW_{in})$ wherein, tanh is a hyperbolic tangent function, and X is input data with respect to the lth multi-path $h_j^l$ of the delay power spectrum in a training stage and is expressed as:

$$X = \begin{bmatrix} h_j^l(1) & h_j^l(2) & \cdots & h_j^l(S) \\ h_j^l(S+1) & h_j^l(S+2) & \cdots & h_j^l(2S) \\ \vdots & \vdots & \ddots & \vdots \\ h_j^l(N_T - S + 1) & \cdots & & h_j^l(N_T) \end{bmatrix}$$

Figure 3:
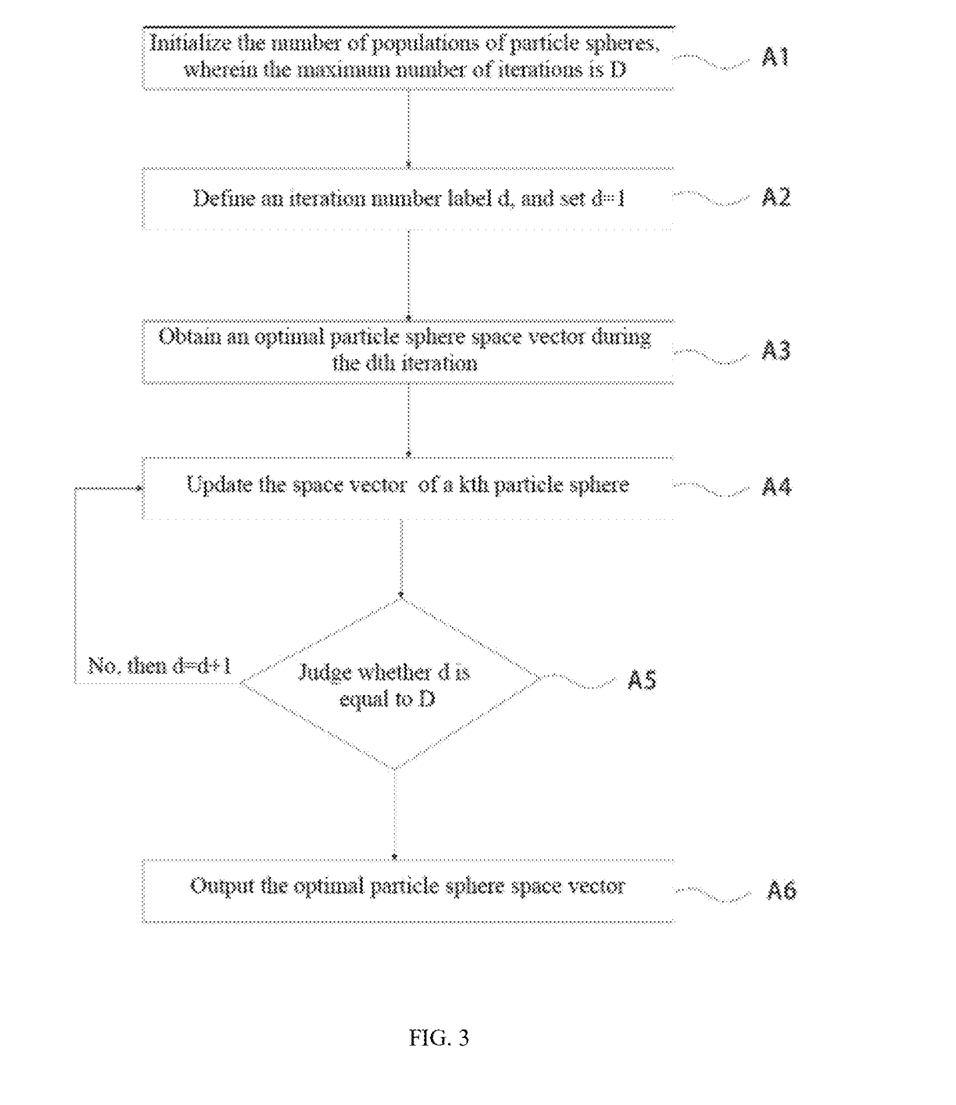
FIG. 3 is a schematic flowchart of optimizing an output weight of a hybrid learning network in a communication networking method applicable to wide-area decentralized charging piles in an embodiment of the present invention.

$N_T$ is the number of data for training the lth multi-path $h_j^l$ of the delay power spectrum in the training stage, and $N_s > N_T$, $W_{in}$ is a connection weight between an input layer and the first feature layer, and $W_{in}$ is randomly generated between 0 and 1;

calculating an output matrix U of the second feature layer:

$U = \tanh(GW)$ wherein, W is a connection weight between the first feature layer and the second feature layer, and W is randomly generated between 0 and 1;

estimating a weight matrix $W_{out}$ of an output layer by a loss function J, which is expressed as:

$$J = \min\left(\|Y - [X; G; U]W_{out}\|_2^2 + \lambda \sum_{i=1}^{N_T+P+Q} W_{out}^2 + \sum_{i=1}^{N_T+P+Q} (\vartheta_i W_{out})^{0.25}\right)$$

wherein, Y is a target matrix corresponding to an input matrix X of the lth multi-path $h_j^l$ of the delay power spectrum in the training stage, [X;G;U] represents a row connection matrix with respect to X, G and U, $\|*\|_2$ represents a $l_2$ norm, λ is a punishment coefficient of the $l_2$ norm, and $\vartheta_i$ is an ith random coefficient between 0 and 1;

solving the loss function J by using an adaptive particle sphere algorithm, so as to obtain an estimated output weight matrix $\hat{W}_{out}$;

further, referring to FIG. 3, solving the loss function J by using the adaptive particle sphere algorithm, so as to obtain the estimated output weight matrix $\hat{W}_{out}$ includes:

A1: initializing the number $M_s$ of populations of particle spheres, wherein a space vector of each particle sphere is $\hat{W}_{out}^k$, k=1, 2, 3, ..., $M_s$ and the maximum number of iterations is D;

A2: defining an iteration number label d, and setting d=1;

A3: performing substitution solution, which includes: substituting the space vector $(\hat{W}_{out}^k)_d$ of a kth particle sphere in the current iteration process into the loss function J, and solving a fitness value $f_d^k$, k=1, 2, 3, ..., $M_s$ of the k-th particle sphere, so as to obtain an optimal particle sphere space vector $(\hat{W}_{out})_{d,opt}$ during the d-th iteration;

A4: updating the space vector of the kth particle sphere, which is expressed as:

$(\hat{W}_{out}^k)_{d+1} = (\hat{W}_{out}^k)_d + \beta((\hat{W}_{out}^g)_d - (1-\varphi)(\hat{W}_{out}^k)_d - \varphi(\hat{W}_{out}^k)_{d-1}) + \alpha(\text{Rand} - 0.5)$ wherein, β, φ, α and Rand are all random coefficients between 0 and 1, $(\hat{W}_{out}^g)_d$ is the space vector of a gth particle sphere during the d-th iteration, g=1, 2, 3, ..., $M_s$, g≠k A5: judging whether d is equal to D; if not, d=d+1, returning to the substitution solution step; and A6: outputting the optimal particle sphere space vector $(\hat{W}_{out})_{opt}$.

The predicted value $\hat{h}_j^l$ of the lth multi-path of the delay power spectrum is obtained by using the trained hybrid learning network.

Further, obtaining the predicted value $\hat{h}_j^l$ of the lth multi-path of the delay power spectrum by using the trained hybrid learning network includes:

in a prediction stage, calculating an output matrix $G_T$ of the first feature layer:

$G_T = \tanh(X_T W_{in})$ wherein, $X_T$ is input data with respect to the l-th multi-path $h_j^l$ of the delay power spectrum in the prediction stage;

calculating an output matrix $U_T$ of the second feature layer:

$U_T = \tanh(G_T W)$ calculating an output matrix $\hat{Y}$ of the output layer:

$\hat{Y} = [X_T; G_T; U_T](\hat{W}_{out})_{opt}$ wherein, $\hat{Y} = \hat{h}_j^l$.

S2034: performing Fourier transform on the predicted $\hat{h}_j^l$ to obtain predicted frequency-domain channel state information $\hat{H}_j$, using the predicted frequency-domain channel state information to jointly calculate a root mean square error $e_j$ with theoretical frequency-domain channel state information $\tilde{H}_j$, wherein the root mean square error is expressed as:

$$e_j = \sum_{i=1}^{L_T} \left(\tilde{h}_j^i - h_j^i\right)^2.$$

S204: sorting the prediction errors, defining the charging pile with the minimum error as a second optimal master node, defining other charging piles in the data set $\Phi$ as secondary nodes;

removing a corresponding charging pile label in $\Phi$ from a total data set $\Phi_{total}$ of charging pile labels to obtain a deleted total data set $\Phi_{total}'$ of charging pile labels;

S205: performing second judgement, wherein the second judgement includes:

judging the distance $r_{i2}$ between the total data set $\Phi_{total}'$ of charging pile labels and the second optimal master node $(x_{2,op}, y_{2,op})$, which distance is expressed as:

$$r_{i2} = \sqrt{(x_i - x_{2,op})^2 + (y_i - y_{2,op})^2}$$

wherein, $i=1, 2, 3, \ldots, N_{\Phi_{total}'}$, $N_{\Phi_{total}'}$ is the size of the total data set $\Phi_{total}'$ of charging pile labels;

S206: sorting the distances of $N_{\Phi_{total}'}$ charging piles, and intercepting n charging piles with the minimum distance to update the master node judgment data set $\Phi$;

S207: predicting channel state information of the second master node and the n charging piles in the data set $\Phi$ by using the hybrid learning network, so as to acquire prediction errors $e_j$, $j=1, 2, 3, \ldots, n$;

S208: sorting the prediction errors, defining the charging pile with the minimum error as a third optimal master node, defining other charging piles in the data set $\Phi$ as secondary nodes; removing a corresponding charging pile label in $\Phi$ from the total data set $\Phi_{total}'$ of charging pile labels to update the deleted total data set $\Phi_{total}'$ of charging pile labels;

S209: judging whether $\Phi_{total}'$ is an empty set; if not, circulating the second judgement; and S210: sequentially outputting the serial numbers of the optimal master nodes.

It should be noted that S200 is to evaluate the quality of a communication environment between the charging piles by the delay power spectrum, and by means of continuous iteration, the charging pile corresponding to the optimal communication environment, that is, the optimal master node, may be selected by an optimal delay power spectrum.

S300: performing connection according to the optimal networking nodes, so as to form a communication network of the wide-area decentralized charging piles.

The above description is a schematic solution of a communication networking method applicable to wide-area decentralized charging piles in the present embodiment. It should be noted that the technical solution of a communication networking system applicable to wide-area decentralized charging piles belongs to the same concept as the technical solution of the communication networking method applicable to wide-area decentralized charging piles mentioned above, therefore with regard to detailed content that is not described in detail in the technical solution of the communication networking system applicable to wide-area decentralized charging piles in the present embodiment, reference may be made to the description of the technical solution of the communication networking method applicable to wide-area decentralized charging piles mentioned above.

The communication networking system applicable to wide-area decentralized charging piles in the present embodiment includes:

an initialization module, configured to initialize the total number of wide-area decentralized charging piles and coordinate parameters thereof;

a judging module, configured to initialize related parameters of a hybrid learning network, and predict and judge optimal networking nodes of the charging piles by using the hybrid learning network; and a networking module, configured to perform connection according to the optimal networking nodes, so as to form a communication network of the wide-area decentralized charging piles.

Figure 4:
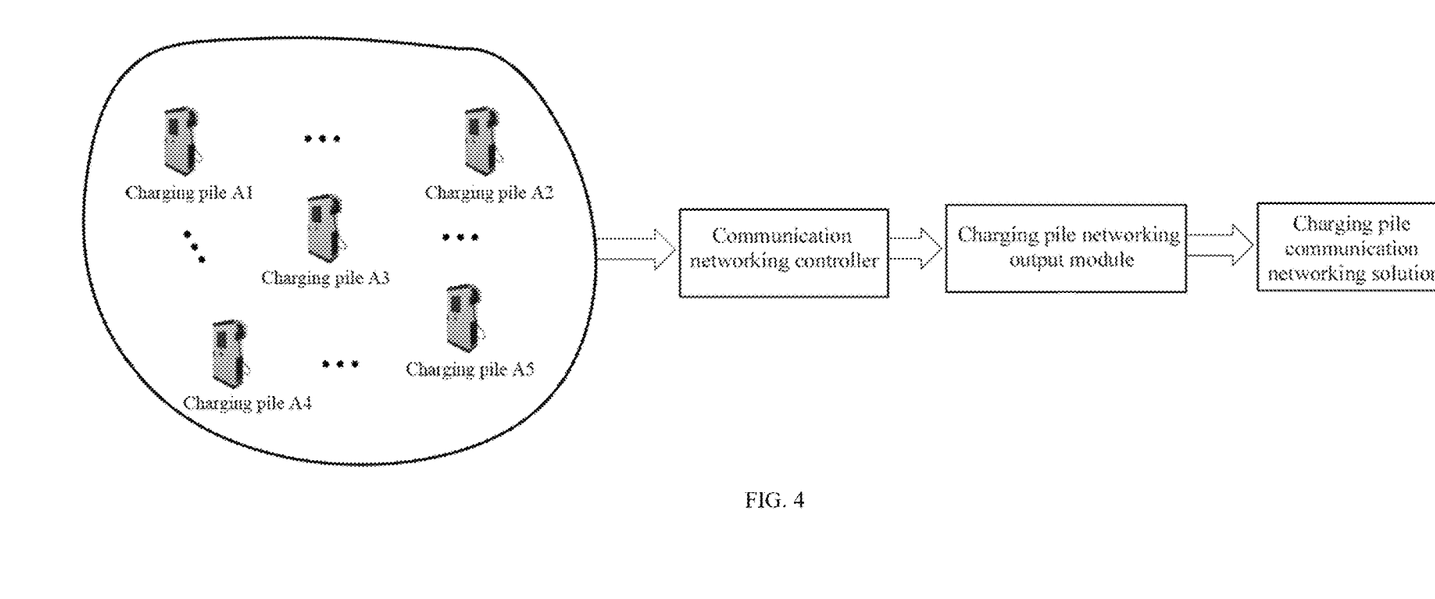
FIG. 4 is a schematic connection diagram of a system apparatus applicable to a communication networking method applicable to wide-area decentralized charging piles in an embodiment of the present invention.

It should be noted that, referring to FIG. 4, a hardware connection of the system may include:

a signal processor, configured to acquire and process power delay spectrum information between the charging piles;

a communication networking controller, configured to output optimal networking nodes; and a charging pile networking output module, configured to form a communication network of the wide-area decentralized charging piles according to the optimal networking nodes.

The present embodiment further provides a computing device, which is applicable to a case of communication networking applicable to wide-area decentralized charging piles, including:

a memory and a processor, wherein the memory is configured to store a computer-executable instruction, and the processor is configured to execute the computer-executable instruction to implement the communication networking method applicable to wide-area decentralized charging piles provided in the above embodiment.

The present embodiment further provides a storage medium, storing a computer program thereon, wherein the program, when executed by a processor, implements the communication networking method applicable to wide-area decentralized charging piles provided in the above embodiment.

The storage medium provided in the present embodiment belongs to the same inventive concept as the communication networking method applicable to wide-area decentralized charging piles provided in the above embodiment, therefore technical details that not described in detail in the present embodiment may refer to the above embodiment, and the present embodiment has the same beneficial effects as the above embodiment.

By means of the descriptions of the above embodiment, those skilled in the art to which the present invention belongs may clearly understand that, the present invention may be implemented by means of software plus necessary universal hardware, and certainly may also be implemented by hardware, but the former is a better embodiment in many cases. Based on this understanding, the technical solutions of the present invention essentially or the part contributing to the prior art may be embodied in the form of a software product, the computer software product may be stored in a computer-readable storage medium, such as a floppy disk of a computer, a read only memory (ROM), a random access memory (RAM), a flash (FLASH), a magnetic disk and an optical disk, and includes several instructions for instructing a computer device (which may be a personal computer, a server, or a network device and the like) to execute the method in various embodiments of the present invention.

Embodiment 2

Based on the above embodiment, the present embodiment provides an application example of a communication networking method applicable to wide-area decentralized charging piles:

In the method of the present invention, decentralized charging piles in a certain industrial park in Jiangning District, Nanjing City are collected for verification. The industrial park occupies 20 square kilometers, and has 42 decentralized charging piles.

In the method of the present invention, on the morning of December 24th from 11:30 am to 31st am, 20,000 channel state information sampling points are collected from each charging pile, and experimental verification is performed by using the communication networking method disclosed in the present invention. It can be seen from the experimental verification that the numbers of first 10 charging piles in a formed communication networking solution are respectively 23-9-41-28-18-14-18-31-2. It can be seen that the communication networking solution disclosed in the present invention can effectively solve the communication networking problem of the wide-area decentralized charging piles.

It should be noted that the above embodiment are only used to illustrate the technical solutions of the present invention rather than limiting, although the present invention has been described in detail with reference to preferred embodiments, those ordinary skilled in the art should understand that modifications or equivalent replacements may be made to the technical solutions of the present invention without departing from the spirit and scope of the technical solutions of the present invention, and these modifications or equivalent replacements shall fall within the scope of the claims of the present invention.

What is claimed is:

1. A communication networking method applicable to wide-area decentralized charging piles, comprising:
    initializing a total number of wide-area decentralized charging piles and coordinate parameters thereof;
    initializing related parameters of a hybrid learning network, and predicting and judging optimal networking nodes of the charging piles by using the hybrid learning network; and
    performing connection according to the optimal networking nodes, so as to form a communication network of the wide-area decentralized charging piles;
    wherein initializing the related parameters of the hybrid learning network, and predicting and judging the optimal networking nodes of the charging piles by using the hybrid learning network, comprises:
    defining a first master node $(x_1, y_1)$ as a first optimal master node $(x_{1,op}, y_{1,op})$, that is, $x_1=x_{1,op}$, $y_1=y_{1,op}$;
    Wherein the first optimal master node is a first node in the communication network of the wide-area decentralized charging piles,
    performing first judgement, wherein the first judgement comprises:
    judging a distance $r_{i1}$ between other charging piles and the first optimal master node, which distance is expressed as: $r_{i1}=\sqrt{(x_i-x_{1,op})^2+(y_i-y_{1,op})^2}$
    wherein, $i=2, 3, \ldots, N$;

sorting distances of N−1 charging piles from small to large, and intercepting n charging piles with a minimum distance to establish a second optimal master node judgment data set Φ, wherein the data set Φ is serial numbers of the n charging piles with the minimum distance to the first optimal master node;
predicting channel state information of the first optimal master node and the n charging piles in the data set Φ by using the hybrid learning network, so as to acquire prediction errors $e_j$, $j=1, 2, 3, \ldots, n$;
sorting the prediction errors, defining a charging pile with a minimum error as a second optimal master node, defining other charging piles in the data set Φ as secondary nodes;
Wherein the second optimal master node is a second node in the communication network of the wide-area decentralized charging piles,
Wherein the predicted errors for improving connections between nodes in the communication network based on distances of nodes within the communication network
removing a corresponding charging pile label in Φ from a total data set $Φ_{total}$ of charging pile labels to obtain a deleted total data set $Φ_{total}'$ of charging pile labels;
performing second judgement, wherein the second judgement comprises:
judging a distance $r_{i2}$ between the total data set $Φ_{total}'$ of charging pile labels and the second optimal master node $(x_{2,op}, y_{2,op})$, which distance is expressed as:

$$r_{i2}=\sqrt{(x_i-x_{2,op})^2+(y_i-y_{2,op})^2}$$

wherein, $i=1, 2, 3, \ldots, N_{Φ_{total}'}$, $N_{Φ_{total}'}$ is a size of the total data set $Φ_{total}'$ of charging pile labels;
sorting distances of $N_{Φ_{total}'}$ charging piles, and intercepting n charging piles with the minimum distance to update the master node judgment data set Φ;
predicting channel state information of the second master node and the n charging piles in the data set Φ by using the hybrid learning network, so as to acquire the prediction errors $e_j$, $j=1, 2, 3, \ldots, n$;
sorting the prediction errors, defining a charging pile with a minimum error as a third optimal master node, defining other charging piles in the data set Φ as secondary nodes; removing a corresponding charging pile label in Φ from the total data set $Φ_{total}'$ of charging pile labels to update the deleted total data set $Φ_{total}'$ of charging pile labels;
Wherein the third optimal master node is a third node in the communication network of the wide-area decentralized charging piles, Wherein the predicted errors for improving connections between nodes in the communication network based on the distances of nodes within the communication network
judging whether $Φ_{total}'$ is an empty set; if not, circulating the second judgement; and
sequentially outputting serial numbers of optimal master nodes;
wherein predicting the channel state information of the second optimal master node and the n charging piles in the data set Φ by using the hybrid learning network, so as to acquire the prediction errors $e_j$, $j=1, 2, 3, \ldots, n$ comprises:
estimating frequency-domain channel state information $H_j \in \mathbb{R}^{K \times N_s}$ of an optimal node and a jth charging pile by using a channel, wherein K and $N_s$ are respectively a total number of sub-carriers and a sampling number of pilot sub-carriers;

acquiring a delay power spectrum $h_j \in \mathbb{R}^{K \times N_s}$ of the optimal node and the jth charging pile by means of inverse decentralized Fourier transform;

establishing a hybrid learning network prediction model for an lth multi-path $h^l_j$ of the delay power spectrum, and performing prediction to obtain a predicted value $\hat{h}^l_j$, l=1, 2, 3, ..., $L_T$ of the lth multi-path, wherein $L_T$ is a total number of transmission multi-paths between the optimal node and the jth charging pile; and performing Fourier transform on the predicted $\hat{h}^l_j$ to obtain predicted frequency-domain channel state information $\hat{H}_j$, using the predicted frequency-domain channel state information to jointly calculate a root mean square error $e_j$ with theoretical frequency-domain channel state information $\tilde{H}_j$, wherein the root mean square error is expressed as:

$$e_j = \sum_{l=1}^{L_T} \left( \hat{h}^l_j - h^l_j \right)^2.$$

2. The communication networking method applicable to wide-area decentralized charging piles according to claim 1, wherein initializing the total number of the wide-area decentralized charging piles and the coordinate parameters thereof comprises:

expressing coordinates of the wide-area decentralized charging piles as: $(x_i, y_i)$, i=1, 2, 3, ..., N, wherein N is the total number of the wide-area decentralized charging piles.

3. The communication networking method applicable to wide-area decentralized charging piles according to claim 1, wherein establishing the hybrid learning network prediction model for the lth multi-path $h^l_j$ of the delay power spectrum comprises:

initializing a number P of neurons of a first feature layer and a number Q of neurons of a second feature layer of the hybrid learning network, and then an output matrix G of the first feature layer may be expressed as:

$G = \tanh(X W_{in})$ wherein, tanh is a hyperbolic tangent function, and X is input data with respect to the lth multi-path $h^l_j$ of the delay power spectrum in a training stage and is expressed as:

$$X = \begin{bmatrix} h^l_j(1) & h^l_j(2) & \cdots & h^l_j(S) \\ h^l_j(S+1) & h^l_j(S+2) & \cdots & h^l_j(2S) \\ \vdots & \vdots & \ddots & \vdots \\ h^l_j(N_T - S + 1) & \cdots & & h^l_j(N_T) \end{bmatrix}$$

$N_T$ is a number of data for training the lth multi-path $h^l_j$ of the delay power spectrum in the training stage, and $N_s > N_T$, $W_{in}$ is a connection weight between an input layer and the first feature layer, and $W_{in}$ is randomly generated between 0 and 1;

calculating an output matrix U of the second feature layer:

$U = \tanh(GW)$ wherein, W is a connection weight between the first feature layer and the second feature layer, and W is randomly generated between 0 and 1;

estimating a weight matrix $W_{out}$ of an output layer by a loss function J, which is expressed as:

$$J = \min \left( \| Y - [X; G; U] W_{out} \|_2^2 + \lambda \sum_{i=1}^{N_T + P + Q} W_{out}^2 + \sum_{i=1}^{N_T + P + Q} (\vartheta_i W_{out})^{0.25} \right)$$

wherein, Y is a target matrix corresponding to an input matrix X of the lth multi-path $h^l_j$ of the delay power spectrum in the training stage, [X;G;U] represents a row connection matrix with respect to X, G and U, $\| * \|_2$ represents a $l_2$ norm, $\lambda$ is a punishment coefficient of the $l_2$ norm, and $\vartheta_i$ is an ith random coefficient between 0 and 1;

solving the loss function J by using an adaptive particle sphere algorithm, so as to obtain an estimated output weight matrix $\hat{W}_{out}$; and obtaining the predicted value $\hat{h}^l_j$ of the lth multi-path of the delay power spectrum by using the trained hybrid learning network.

4. The communication networking method applicable to wide-area decentralized charging piles according to claim 3, wherein solving the loss function J by using the adaptive particle sphere algorithm, so as to obtain the estimated output weight matrix $\hat{W}_{out}$ comprises:

initializing a number $M_s$ of populations of particle spheres, wherein a space vector of each particle sphere is $\hat{W}_{out}^k$, k=1, 2, 3, ..., $M_s$, and a maximum number of iterations is D;

defining an iteration number label d, and setting d=1;

performing substitution solution, which comprises: substituting the space vector $(\hat{W}_{out}^k)_d$ of a kth particle sphere in a current iteration process into the loss function J, and solving a fitness value $f_d^k$, k=1, 2, 3, ..., $M_s$ of the kth particle sphere, so as to obtain an optimal particle sphere space vector $(\hat{W}_{out})_{d,opt}$ during the dth iteration;

updating the space vector of the kth particle sphere, which is expressed as:

$(\hat{W}_{out}^k)_{d+1} = (\hat{W}_{out}^k)_d + \beta((\hat{W}_{out}^g)_d - (1-\varphi)(\hat{W}_{out}^k)_d - \varphi(\hat{W}_{out}^k)_{d-1}) + \alpha(\text{Rand} - 0.5)$ wherein, $\beta$, $\varphi$, $\alpha$ and Rand are all random coefficients between 0 and 1, $(\hat{W}_{out}^g)_d$ is a space vector of a gth particle sphere during the d-th iteration, g=1, 2, 3, ..., $M_s$, g≠k;

judging whether d is equal to D; if not, d=d+1, returning to the substitution solution step; and outputting the optimal particle sphere space vector $(\hat{W}_{out})_{opt}$.

5. The communication networking method applicable to wide-area decentralized charging piles according to claim 3, wherein obtaining the predicted value $\hat{h}^l_j$ of the lth multi-path of the delay power spectrum by using the trained hybrid learning network comprises:

in a prediction stage, calculating an output matrix $G_T$ of the first feature layer:

$G_T = \tanh(X_T W_{in})$ wherein, $X_T$ is input data with respect to the lth multi-path $h^l_j$ of the delay power spectrum in the prediction stage;

calculating an output matrix $U_T$ of the second feature layer:

$U_T = \tanh(G_T W)$; and calculating an output matrix $\hat{Y}$ of the output layer:

$\hat{Y} = [X_T; G_T; U_T](\hat{W}_{out})_{opt}$ wherein, $\hat{Y} = \hat{h}^l_j$.

6. The communication networking method applicable to wide-area decentralized charging piles according to claim 4, wherein obtaining the predicted value $\hat{h}^l_j$ of the lth multi-path of the delay power spectrum by using the trained hybrid learning network comprises:

in a prediction stage, calculating an output matrix $G_T$ of the first feature layer:

$$G_T = \tanh(X_T W_{in})$$

wherein, $X_T$ is input data with respect to the lth multi-path $h^l_j$ of the delay power spectrum in the prediction stage;

calculating an output matrix $U_T$ of the second feature layer:

$$U_T = \tanh(G_T W); \text{ and}$$

calculating an output matrix $\hat{Y}$ of the output layer:

$$\hat{Y} = [X_T; G_T; U_T](\hat{W}_{out})_{opt}$$

wherein, $\hat{Y} = \hat{h}^l_j$.

\* \* \* \* \*